United States Patent [19]

DiMartino

[11] 4,419,034

[45] Dec. 6, 1983

[54] TELESCOPABLE RETRACTABLE STACKER KEY LOCKING DEVICE

[75] Inventor: John M. DiMartino, Sayville, N.Y.

[73] Assignee: Line Fast Corporation, Holbrook, N.Y.

[21] Appl. No.: 224,320

[22] Filed: Jan. 12, 1981

[51] Int. Cl.³ .......................... B60P 7/08; B60P 7/13; B61P 49/00
[52] U.S. Cl. ........................................ 410/83; 24/453; 410/77
[58] Field of Search ............ 24/201 A, 221 R, 221 A, 24/265 CD, 212; 410/69, 80, 81, 82, 83, 84, 85, 77

[56] References Cited

U.S. PATENT DOCUMENTS

| 3,612,466 | 10/1971 | Arnold | 410/83 |
| 3,975,804 | 8/1976 | Schenk | 24/221 A |
| 4,023,504 | 5/1977 | Gray | 410/82 |
| 4,212,251 | 7/1980 | DiMartino | 410/69 |

FOREIGN PATENT DOCUMENTS

| 2305001 | 8/1974 | Fed. Rep. of Germany | 410/83 |
| 1189426 | 4/1970 | United Kingdom | 410/83 |
| 1283795 | 8/1972 | United Kingdom | 410/83 |

Primary Examiner—Bruce H. Stoner, Jr.
Assistant Examiner—Howard Beltran
Attorney, Agent, or Firm—Robert A. Kelly

[57] ABSTRACT

A locking device for a vehicle platform adapted for securing a corner fitting of a shipping container wherein the device has a housing fixidly mounted on and beneath the upper surface of the platform, having a neck member and a horizontal latching member mounted within the housing when the device is in a first position adapted to being elevated to enter a slot in a corner fitting when a container is placed on the platform with the latching member being capable of being rotated to a second position for elevation and rotation to engage an inner surface of the corner fitting to lock the container fitting to the upper surface of the platform and capable of being returned to a first position whereby it is beneath the upper surface of the platform.

6 Claims, 10 Drawing Figures

TELESCOPABLE RETRACTABLE STACKER KEY LOCKING DEVICE

BACKGROUND OF THE INVENTION

This invention refers to an apparatus for releasibly securing a freight car container of standard type (ISO standard) to a platform, such as the flat bed of a truck and the like wherein the locking device can be completely withdrawn beneath the surface of the platform when not in use and that the vertical dimension of the device is shortened when retracted.

As is well known in the art, standard freight containers of the type described, have at each corner fitting in which there is an elongated orifice in the horizontal face, which orifice opens into a recess within the corner fitting. There is a wide variety of devices that have been designed to releasibly lock corner fittings of one container to corner fittings of another container and also to releasibly lock a corner fitting to a deck. The state of the art is shown in U.S. Pat. No. 4,212,251, issued July 15, 1980 to John DiMartino entitled "Key Actuated Stacker Locking Device", which shows a locking device which can be welded to a deck having a base plate, a neck member and a rotatable crosshead member. In this type device, the crosshead member and neck member are brought into alignment with each other as they rise up from the base member, and the corner fitting is loaded onto it with the crosshead member and the neck member entering the horizontal orifice of the corner fitting. Thereafter, the crosshead member is rotated so that its elongated axis biases across the elongated opening of the elongated orifice or the corner fitting and abuts onto the inner wall of the corner fitting to lock it to the deck. The base can be welded onto the deck to cause the container to thereby become affixed releasibly to the deck.

A particular problem arises when locking devices are attempted to be used on flat bed truck platforms and railroad car platforms in that the ideal place to space the locking device is located over the wheel. In such instances, the space between the wheel and the underside of the platform is very narrow and for a retractable device to be successfully employed here; a way has been sought to shorten the vertical dimension of the lock when it is in its retracted position to avoid having the locking device mechanism from contacting the outer surface of the wheel.

The prior art devices have been very useful in ships and railroad flat cars which are designed to merely haul containers. The use of containers on flat bed trucks has been limited due to the fact that when the prior art container locks are welded onto the deck of the truck, they are left protruding up above the deck of the truck to block the use of the full truck bed platform which it is desired to lay flat items such as sheet metal, flush onto the deck. This same problem exists with respect to flat-bed railroad cars.

The art has sought methods of lashing the container onto the truck bed; in general the truckers utilize chain lashings to hold the containers onto the deck because of the problem with prior art locking devices sticking up through the deck when not in use. The use of chain lashing is both an inconvenience which is costly in turn around time, in loading and unloading, and further, it is dangerous due to the fact that the chains are not the safest method of securing the container to the deck.

The art has long sought a container interlock which is economic to produce, easily actuable and which can overcome the inconvenience posed by lashing containers to a deck, and which can be retracted beneath the deck when it is so desired, and still have the strength and safety features of conventional interlocks. The interlock for use on such truck body surfaces must be easily installed and easily removed to a point below the deck and be able to withstand tremendous forces applied to them in normal use.

SUMMARY OF THE INVENTION

A heavy duty retractable selectively operable stacker key locking device adapted to secure a corner fitting of a shipping container to a flat base member wherein the device can be retracted and vertically partially telescoped beneath the base member, the corner fitting having an elongated orifice in the underside thereof for engagement with the locking device comprising, a cylindrically shaped tubular housing, having a bottom wall and side walls, depending from the base member forming a vertical passageway having an upper orifice communicating with the area above the base member, keyway orifice formed in the bottom wall of the housing, shaft member vertically and rotatably mounted in the tubular housing and extending through the keyway orifice, a crosshead member fixidly mounted on the upper end of the shaft member, retainer ring mounted on the lower end of the shaft member to prevent the lower end of the shaft member from being drawn upwardly through the lower orifice of the tubular housing, a neck member slideable rotatably mounted on the shaft member located beneath the crosshead member, the neck member being vertically slideably non rotatably mounted within and with respect to the tubular housing and capable of having a portion thereof extended through the upper orifice thereof, to be entrained within the elongated orifice of the corner fitting, the crosshead member and the neck member having elongated lateral cross sectional areas substantially similar in size and shape to the elongated orifice of the corner fitting, groove traversing across the shorter axis of the upper surface of the neck member capable of vertically entraining the crosshead member therein when the elongated axis of the crosshead member is biased across the shorter axis of the neck member when the crosshead member and the neck member are fully retracted within the tubular housing, key member fixidly mounted on the shaft member shaped and dimensioned to pass vertically non rotatably through the keyway orifice, the key member being positioned on the housing a sufficient distance apart from the crosshead member to allow the key member to be positioned beneath the tubular housing when the device is in a retracted position, the key member has an upper surface dimensioned area which prevents it from being drawn through the neck opening, and a vertical dimension and position on the shaft member which causes it to raise the neck member partially above the upper orifice of the tubular housing while simultaneously raising the crosshead member to a position such that the underside of the head member is completely above the neck member with the lower side of the key member being above the inner bottom wall of the tubular housing to permit simultaneous rotation of the shaft member and the key member while having the upper surface of the retainer ring abutting against the outerside of the bottom wall of the tubular housing to permit further elevation of the shaft member, a lever fixidly attached to the retainer ring to facilitate elevation of and rotation of the shaft member.

In a preferred embodiment of our invention, the retainer ring and the key member and the lower segment of the shaft member is made up from a single casting having a shaftway extending down from the top of the casting adopted with screws' threads around the inside thereof adapted to receive the upper portion of the shaft member to be screwed therein to connect both portions of the shaft member. Further, in that preferred embodiment, the lower portion of the shaft member forms a portion of the key member and has keys extending from the outer surfaces thereof which are mateable into the keyway orifice to permit the lower portion of the shaft having the keys thereon to be vertically raised up through the keyway orifice with provision of course that the shaft cannot be rotated while the keys are entrained within the keyway orifice. In the preferred embodiment of our invention, a ball detente member is inserted through the side walls of the neck member so that the ball is urged to fit into recesses mounted within the shaft member at a level wherein the crosshead member can be rotated around and the neck member is elevated for insertion within the orifice of a corner fitting.

DETAILED DESCRIPTION OF THE PREFERRED EMBODIMENTS

In the following description, the terms, upwardly, downwardly, inwardly, outwardly, under service and top service, are used for descriptive purposes and are to be understood as to conform with the orientation of the device as shown on the drawings.

Figure 1:
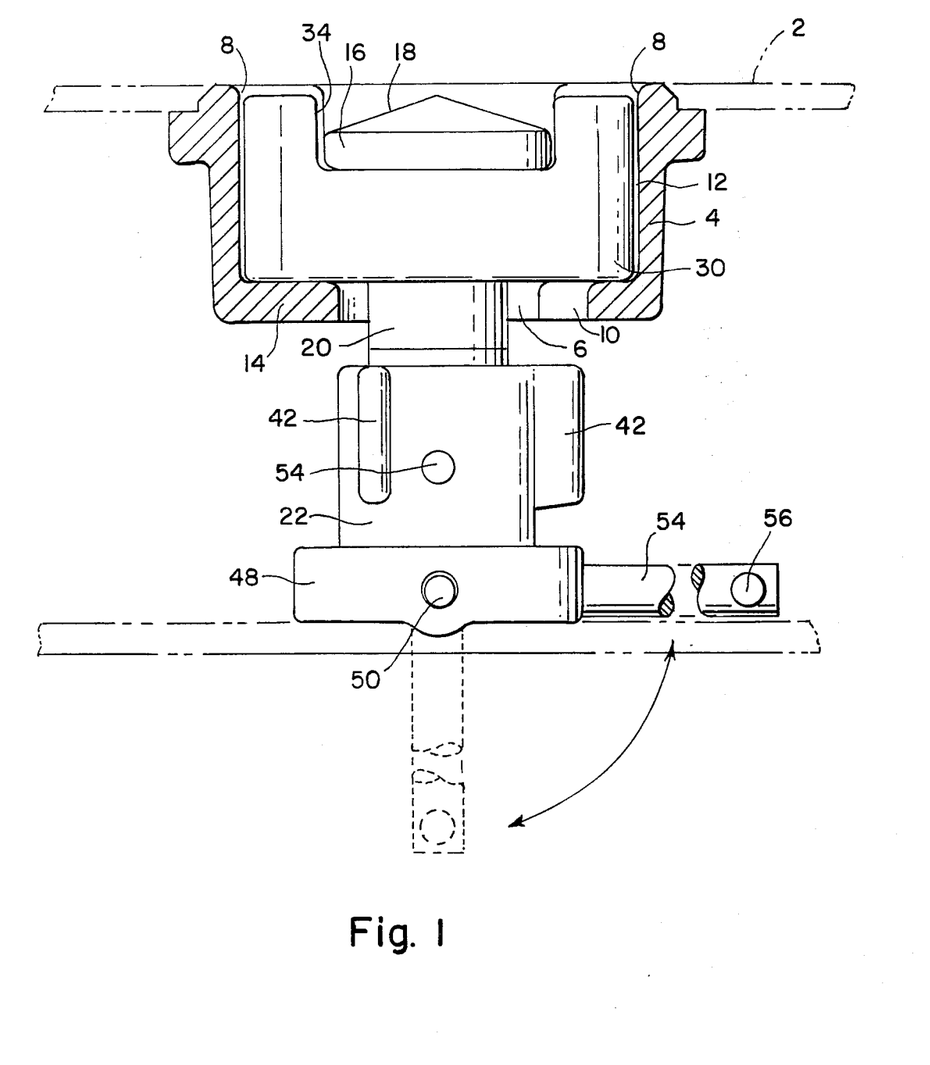
FIG. 1 is a vertical partial section of a corner fitting assembly wherein the assembly is retracted beneath the platform and the crosshead member is telescoped vertically within and perpendicularly mounted across the neck member which neck member is wholly retracted in the tubular housing.

FIG. 1 shows a partial section of a stacker key locking device shown constructed in accordance with the principles of this invention wherein the device is retracted into tubular housing 4 shown in the figure, with no portion of the device projecting above platform 2.

Shown in FIG. 1 is a platform 2 wherein the platform such as a truck body platform has a tubular housing 4 welded thereto. The tubular housing 4 has an upper orifice 8 which opens out onto the upper surface of the platform 2 permitting communication from the area above down into tubular housing 4. Tubular housing 4 extends vertically downward from the platform 2 and has bottom wall 14 which bottom wall has a keyway orifice 6 which keyway orifice 6 forms a keyway as more clearly shown in FIG. 5, which figure is a top view looking down at an empty tubular housing 4 and that lower orifice 6 has key slots 10 therein.

Mounted in the tubular housing is a shaft member 20 which is vertically and rotatably mounted in the tubular housing 4 and extending through the lower orifice 6 of the tubular housing 4. Crosshead member 16 having sloped upper surface 18 is fixidly mounted on the upper end of the shaft member 20, such that when shaft member 20 is rotated, crosshead member 16 is simultaneously similarly rotated.

Figure 6:
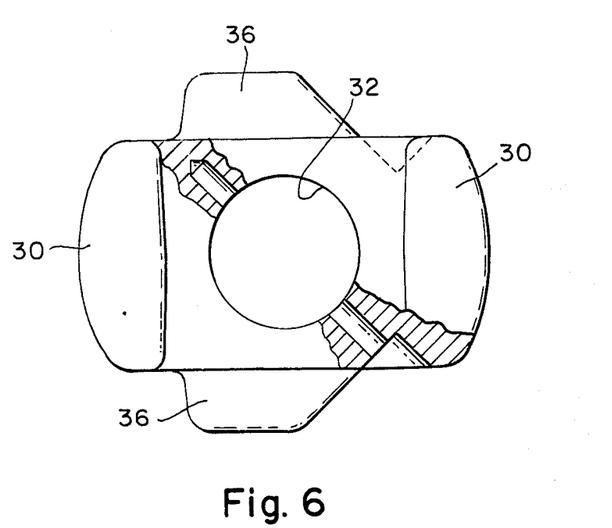
FIG. 6 is a top view of a neck member.
Figure 7:
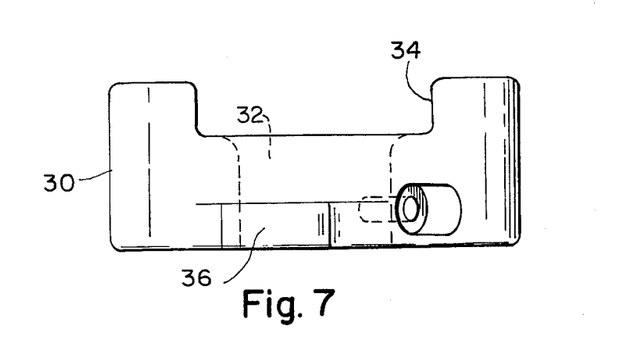
FIG. 7 is a side view of the elongated axis of a neck member.
Figure 8:
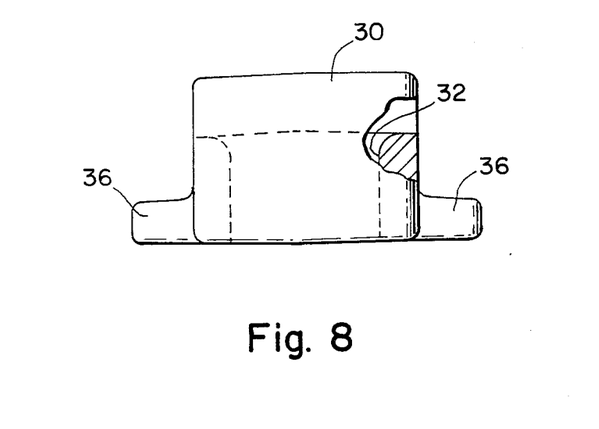
FIG. 8 is an end side view across the short axis of the neck member.

The shaft member 20 is rotatably mounted within an opening 32 which opening 32 forms a vertical shaftway through neck member 30. The mounting of the shaft member 20 can be passed through opening 32 of neck member 30 shown in FIG. 6, said opening 32 in neck member 30 permitting the neck member 30 to ride up and down vertically on the shaft member 20 as well as to permit the shaft member 20 to rotate within opening 32. Neck member 30 as shown from the top view of FIG. 6 has an elongated cross sectional area with an elongated axis as shown in FIG. 6 and a short cross sectional area axis with respect to its upper portion.

Figure 5:
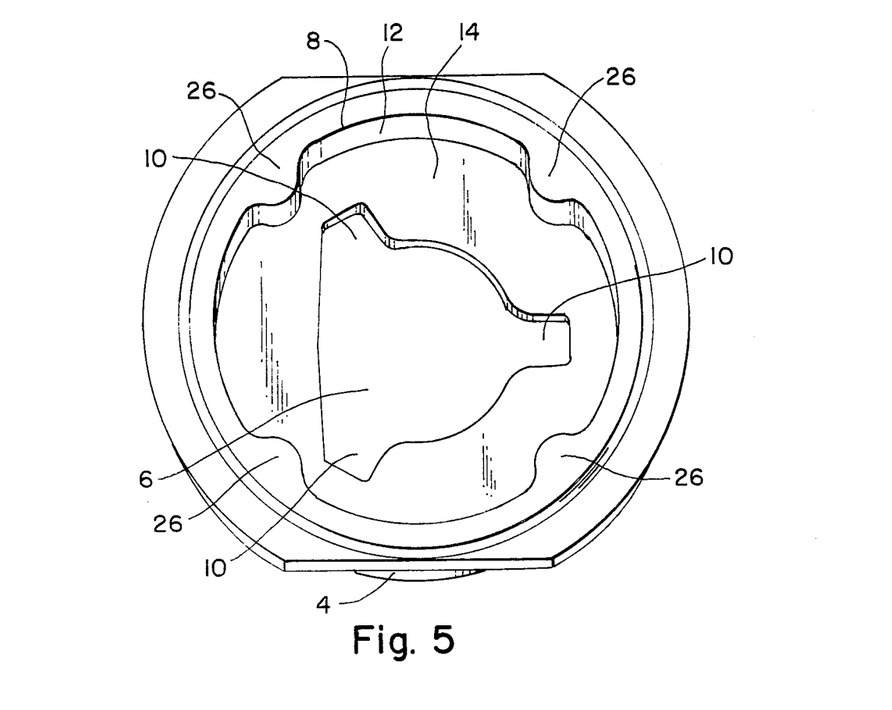
FIG. 5 is a top view of a tubular housing.
Figure 10:
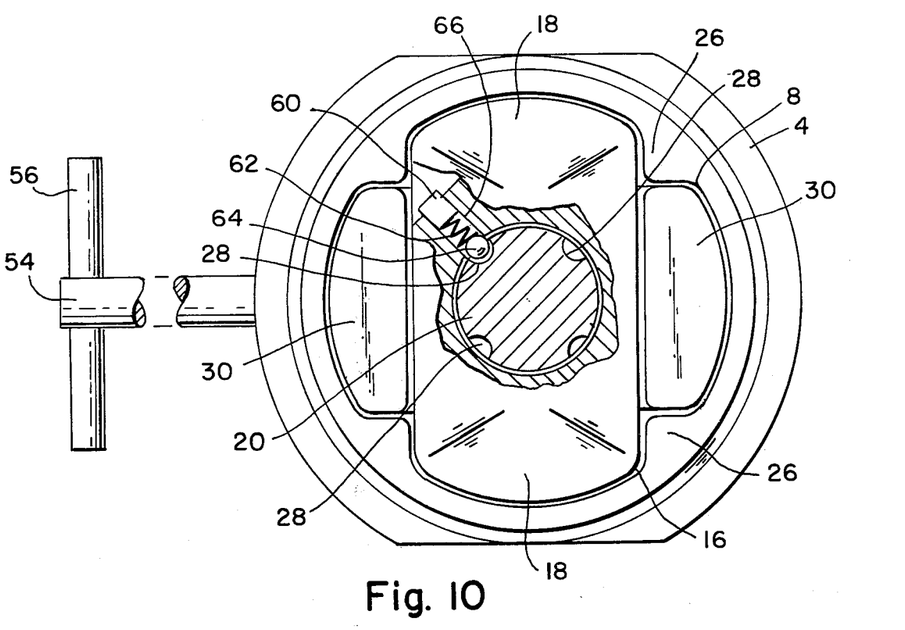
FIG. 10 is a top view of a locking device showing partial cutaway view showing a ball detente system installed in the neck member.

Boss 26 as shown in FIG. 10 and in FIG. 5 extend vertically down through the tubular housing 4 and provide a track whereby neck member 30 is prevented from rotating with respect to the tubular housing 4 during all phases of the operation of the locking device while providing a guide track to permit vertical reciprocal motion of neck member 30 with respect to the tubular housing 4. In a preferred embodiment of the invention, bitts 36 are provided to extend out from the sides of the elongated axis of neck member 30 as shown in FIG. 6 additionally to fit inbetween the boss means 26 to provide additional support to prevent rotation of neck means 30 with respect to the tubular housing 4. The lateral cross sectional areas of neck member 30 and crosshead member 16 are of such shape and dimension as to permit them to be inserted into the elongated opening of a corner fitting and to substantially fill up the area created by the bottom orifice in a corner fitting.

A portion of the shaft member 20 extends through and beneath the keyway orifice 6 located in the bottom wall 14 of the tubular housing 4. Retainer ring 48 shown in FIG. 9 and FIGS. 1, 2, and 3 is mounted on shaft member 20 to prevent the passage of the lower end of shaft member 20 up through the keyway orifice 6 of the tubular housing 4. Key member 22 forms a portion of the lower portion of shaft member 20 and has keys 42 extending from the sides of key member 22, which are compatible with passage thereof through the keyway orifice 6 and keyway slots 10 located in the bottom wall 14 of the tubular housing 4, and are fixidly mounted on the shaft member 20. The key member 22 rotates when the shaft member 20 is rotated. The key member 22 and keys 42 are of such size and shape to prevent them from passing through the opening 32 in neck member 30.

Neck member 30 has a groove 34 biasing across the elongated axis of the upper surface of neck member 30.

The groove 34 is so sized and shaped as to permit the crosshead member 16 to be vertically retracted within the groove 34 when the elongated axis of the crosshead member 16 is positioned across the short axis of neck member 30 and an elongated axis as shown in the lateral cross sectional of its upper portion of neck member 30. In the preferred embodiment of our invention, the vertical depth of the groove 34 is equal to the vertical thickness of crosshead member 16, such that when the crosshead member 16 is retracted within the groove 34 as shown in FIG. 1, the uppermost portion of crosshead member 16 is in substantial lateral alignment with the upper surface of neck member 30.

Figure 2:
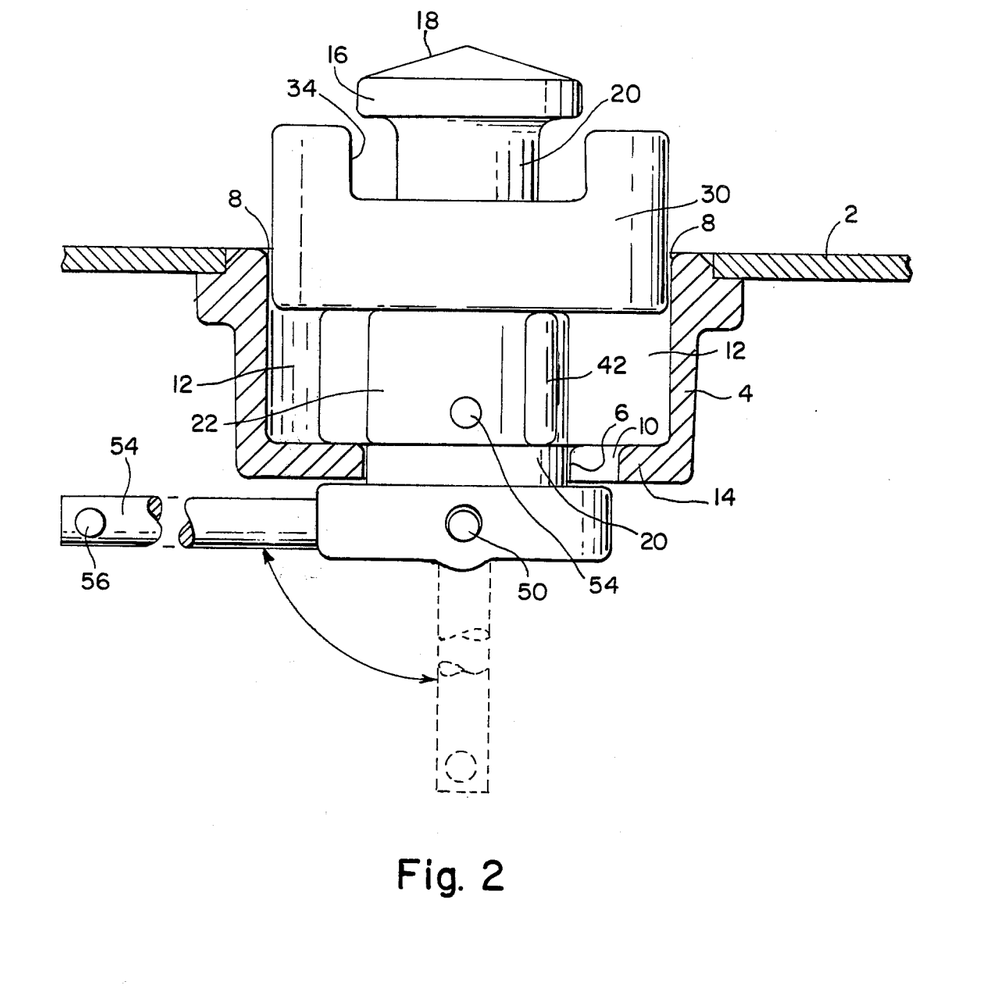
FIG. 2 is similar to FIG. 1 except in that crosshead member and neck member have been elevated to a position wherein the crosshead member extends above the neck member and the neck member extends above the tubular housing, which position is the locking position.

The length of the shaft member 20 may easily be determined in that it should be of sufficient length to pass a portion thereof through the neck member 30 and permit a space between the under portion of neck member 30 and the upper portion of upper surface area of the key member 22 including the keys 42 thereon having a distance equal to the vertical thickness of the crosshead member to raise the underside of the crosshead member above the upper surface of the neck member while simultaneously bringing the upper surface of the key member 22 and keys 42 into contact with the undersurface of the neck member having passed a portion of the key member 22 and keys 42 through the keyway orifice 6 of the tubular housing 4. Further, the key member 22 should be of sufficient length to provide a portion thereof beneath the keys 42 and the upper surface of the retainer ring 48 equal in thickness to the bottom wall of tubular housing 4, to permit rotation thereof, when the keys 42 are entrained within the tubular housing 4 as shown in FIG. 2. Additionally, the shaft member 20 must be of a length to allow the keys 42 extending laterally therefrom to become entrained within tubular housing 4. The height of keys 42 should be of a height sufficient that when the keys 42 are raised through the keyway orifice 6 of the tubular housing 4, they will simultaneously raise the neck member 30 and the crosshead member 16 to a position shown in FIG. 2 wherein the neck member 30 is raised out of the upper orifice 8 of the tubular housing 4 in order that the neck member 30 may penetrate to the desired depth into the elongated orifice of a corner fitting, which depth is equal to the thickness of the underside wall of a corner fitting and raise the crosshead member 16 to a position where the under surface of the crosshead member 16 shall be above the upper surface of the neck member 30 to permit rotation of the crosshead member 16 to a locking position within a corner fitting and to entrain the key member 22 having the keys 42 thereon within tubular housing 4.

Figure 3:
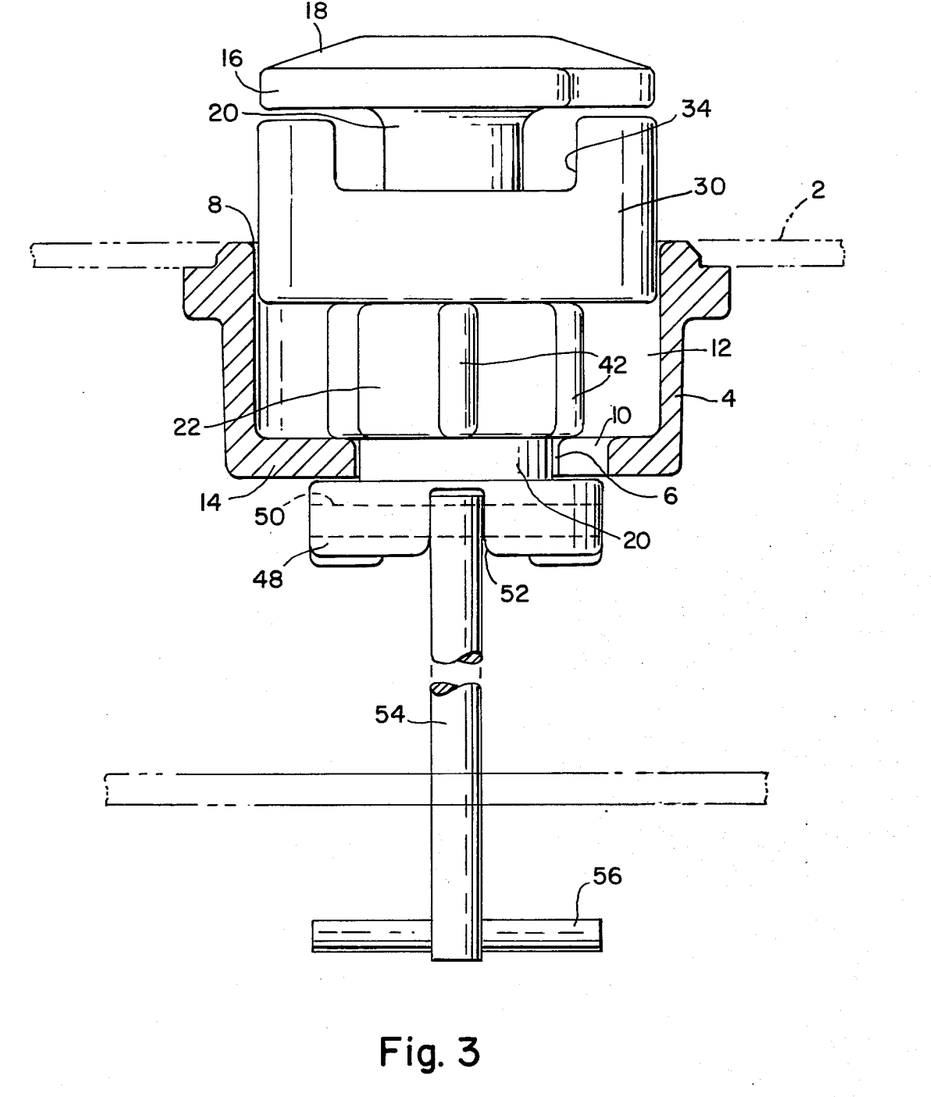
FIG. 3 is similar to FIG. 2 except that the crosshead member and the neck member have been brought into alignment with each other preparatory to loading a corner fitting thereon.

FIG. 1 shows a stacker key locking device in a completely retracted position. FIG. 2, a partial section of a stacker key locking device of this invention wherein the device has been raised to a second position enabling the shaft member 20 to be rotated to bring the elongated axis of the crosshead member 16 and the elongated axis of the neck member 30 into substantial alignment with each other, which aligned position is shown in FIG. 3. The device as shown in FIG. 3 is ready for loading of a container corner fitting thereon. The keys 42 of key member 22 are resting as shown in FIG. 3 on the upper surface of the bottom wall 14 of the tubular housing 4 thus preventing the device from being pushed back down into the retracted position shown in FIG. 1. After the corner fitting has been loaded onto the locking device with neck member 30 and crosshead member 16 inserted into the orifice of the corner fitting, the shaft member 20 is again rotated to rotate the crosshead member 16 to bring it into locking engagement with the inner wall of a corner fitting, in a locking relationship.

FIG. 10 shown is a top view of a locking device a partial cutaway to show that in the neck member 30 a ball detente mechanism can be inserted laterally through the wall of the neck member 30 to engage with a recess 28 in the outer surface of the shaft member 20; the ball detente mechanism as shown in FIG. 10 consist of a ball 64 urged forward by a spring 62 and held in place by screw 60 in a channel 66 located in the neck member 30 engages a recess 28. The recess 28 in the shaft member 20 are spaced approximately 90 degrees apart around a lateral planar cross section of the shaft member 20. The spacing of the recesses 28 in this preferred embodiment permits users thereof to judge exactly the position of the crosshead member when using the device to lock containers on to a platform.

Figure 4:
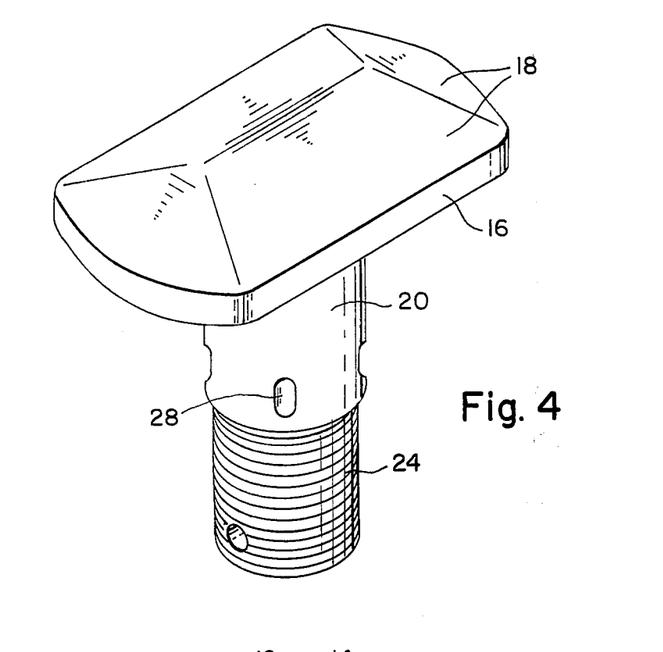
FIG. 4 shows a view of the crosshead member and a portion of a shaft member.
Figure 9:
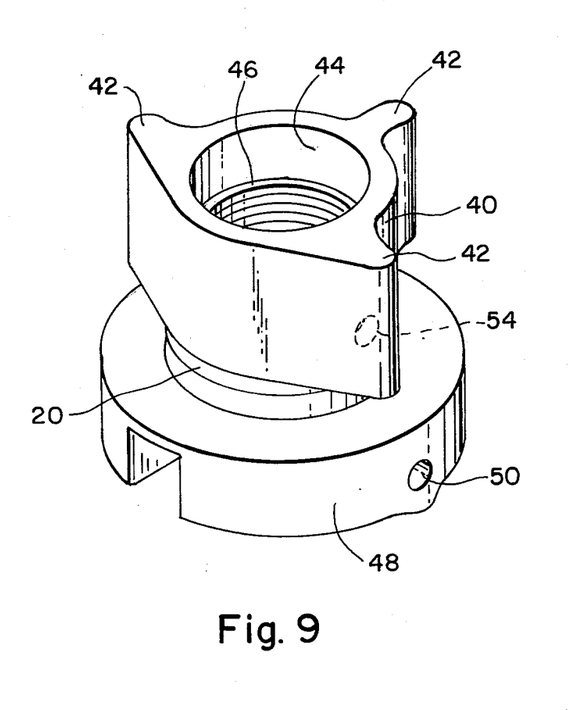
FIG. 9 is a view of a combination of a portion of a shaft member, retainer ring and key member.

FIG. 9 shows an extension of shaft member 20 having key member 22 with keys 42 radiating out from the sides thereof and a retainer ring 48 mounted on a lower end of a shaft member 20. As shown in FIG. 9 this can be a one piece casting shown in FIG. 9 having a shaftway 44 with threads 46 cut in the inner wall thereof which is operably connected to the threads 24 located on the lower portion of shaft member 20 shown in FIG. 4. In the preferred embodiment, we use this one piece casting to provide two portions of a shaft member 20 as well as the key member 22 with keys 42 thereon. It provides for an efficient economical method of manufacturing and assembling these devices, the benefits of which would be obvious to anybody skilled in the art. A pin 54 is utilized to fixidly mount both the shaft member 20 and the key member 22 together. The lower portion of the shaft member 20 beneath the keys 42 shown in FIG. 9 has a vertical dimension equal approximately to the bottom wall 14 of the tubular housing 4.

Also provided is a pin 50 in the retainer ring 48 to permit lever 54 to be mounted thereon in a groove slot 52 formed in the underside of retainer ring 48 as shown in FIG. 2. Handle 56 is mounted on lever 54 merely to aid in the actuation of the device. Neither lever 54 or handle 56 is essential to the operation of this device but is included in the preferred embodiment of our invention as it provides a convenience to the users thereof.

It will be obvious to those skilled in the art that many variations and substitutions can be made as to the size and shapes of various components of this invention within its overall principles. The number of and shapes of key slots 10, key member 22 and keys 42 obviously can be varied. The choice of materials of construction will depend upon the ultimate use in which the devices are to be put.

In operation, the device when not in use is normally positioned as shown in FIG. 1. To actuate the device the user can manually vertically push the retainer ring 48 until the upper surface of the retainer ring 48 is adjacent to the undersurface of the tubular housing 4 as shown in FIG. 2. In FIG. 2 a portion of the neck member 30, crosshead member 16 and a portion of shaft member 20 extend above the upper level of tubular housing 4 with the key member 22 and keys 42 entirely entrained within the tubular housing 4 and rotatable with respect thereto. Thereafter, the shaft member 20 is rotated 90 degrees to bring the elongated axis of the lateral cross sectional areas of both the crosshead member 16 and neck member 30 into alignment with each other while simultaneously ensuring that the keys 42 and keyway orifice 10 are not in alignment with each other to prevent the crosshead member 16 and neck member 30 from being retracted back within the tubular housing 4. This latter position is the loading position and is shown in FIG. 3. When affixing the devices of this invention onto a platform such as a truck body, care must be taken to affix the device in a position such that the corner fitting of a shipping container can be operably positioned onto the crosshead member 16 and neck member 30 when loading and unloading the container. After the corner fitting of the shipping container has the crosshead member 16 and neck member 30 inserted therein, the shaft member 20 is rotated to bring the underside of the crosshead member 16 into a locking relationship with the inside wall of the corner fitting. To remove the container, all one must do is reverse the locking operation and retract the crosshead member 16 and neck member 30 back within the tubular housing. This latter feature prevents damage to the locking device when off-loading is carried out.

What is claimed is:

1. A heavy duty retractable selectively operable stacker key locking device adapted to secure a corner fitting of a shipping container to a flat base member wherein the device can be retracted and vertically partially telescoped beneath the base member, the corner fitting having an elongated orifice in the underside thereof for engagement with the locking device comprising:
    (a) a tubular housing having a bottom wall and side walls, depending from the base member forming a vertical passageway having an upper orifice communicating with the area above the base member;
    (b) a keyway orifice formed in the bottom wall of the housing;
    (c) a shaft member vertically and rotatably mounted in the tubular housing and extending through the keyway orifice;
    (d) a crosshead member fixidly mounted on the upper end of the shaft member;
    (e) retainer means mounted on the lower end of the shaft member to prevent the shaft member from being drawn upwardly through the keyway orifice of the tubular housing;
    (f) a neck member mounted within the tubular housing and capable of having a portion of said neck member being extended through the upper orifice thereof and of vertical reciptocation with respect to the tubular housing, the crosshead member and the neck member having a lateral cross sectional area similar in size and shape to the elongated orifice of a corner fitting;
    (g) a shaftway extending through the center of the neck of a size sufficient to entrain a portion of the shaft member and to permit the shaft member to move vertically and rotatably with respect to the neck member when entrained therein;
    (h) groove means traversing across the shorter axis of the upper surface of the neck member capable of entraining the crosshead member therein when the elongated axis of the crosshead member is biased across the shorter axis of the neck member when the crosshead member and neck member are fully retracted within the tubular housing;
    (i) key means fixidly mounted on the shaft member shaped and dimensioned to pass vertically through the keyway orifice, the key means being positioned on the shaft member a sufficient distance apart from the crosshead member to allow the key means to be positioned beneath the tubular housing when the device is in a retracted position, the key means having an upper surface area which prevents it from being drawn through the passageway of the neck opening, and a vertical dimension which causes it to raise the neck member partially above the upper orifice of the tubular housing while simultaneously raising the crosshead member to a position such that the underside of the crosshead member is completely above the neck member with the lower side of the key means being above the inner bottom wall of the tubular housing while simultaneously having a rotatable portion of the shaft member entrained within the keyway orifice and having the upper surface of the retainer means abutting against the outerside of the bottom wall of the tubular housing;
    (j) lever means fixidly attached to the retainer means to facilitate rotation of the shaft member.

2. The stacker key locking device of claim 1 wherein the tubular housing has at least two boss means vertically extending along the inner walls thereof to prevent rotational motion of the neck means entrained therein.

3. The stacker key locking device of claim 2 wherein there are four bosses.

4. The stacker key locking device of claim 3 wherein the vertical depth of the groove means is equal to the vertical thickness of the crosshead member.

5. The stacker key locking device of claim 4 wherein the distance between the under surface of the neck member and the upper surface of the key means is equal to the thickness of the crosshead member.

6. The stacker key locking device of claim 5 wherein the distance between the upper surface of the retainer means and the lower surface of the key means is equal to the thickness of the bottom wall of the tubular housing.

* * * * *